United States Patent
Barcala et al.

(10) Patent No.: US 9,916,559 B2
(45) Date of Patent: Mar. 13, 2018

(54) MOBILE TRANSCEIVER HAVING SELECTABLE TRAVEL MODES AND A METHOD OF OPERATION

(71) Applicant: BlackBerry Limited, Waterloo (CA)

(72) Inventors: Sergio Barcala, Coconut Creek, FL (US); Michelle Marie Dupuis, Boca Raton, FL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/987,313

(22) Filed: Jan. 4, 2016

(65) Prior Publication Data

US 2017/0193443 A1 Jul. 6, 2017

(51) Int. Cl.
*H04W 24/00* (2009.01)
*G06Q 10/08* (2012.01)
*H04W 4/02* (2018.01)

(52) U.S. Cl.
CPC .......... *G06Q 10/0833* (2013.01); *H04W 4/02* (2013.01)

(58) Field of Classification Search
CPC ........... H04W 4/02; H04W 4/12; H04W 4/14; H04W 64/00
USPC ............................................ 455/456.1, 456.2
See application file for complete search history.

(56) References Cited

U.S. PATENT DOCUMENTS

| 8,315,959 B2 | 11/2012 | Zheng |
| 8,655,378 B1 | 2/2014 | Crossno |
| 2016/0105868 A1* | 4/2016 | Lee ..................... H04W 64/006 455/456.6 |

FOREIGN PATENT DOCUMENTS

| CA | 2176868 | 12/1996 |
| WO | WO 9942968 | 8/1999 |
| WO | WO 2009052455 | 4/2009 |
| WO | WO2009109779 | 9/2009 |

OTHER PUBLICATIONS

International Search Report and Written Opinion; PCT/CA2016/051526;dated Mar. 27, 2017.

* cited by examiner

*Primary Examiner* — Temica M Beamer
(74) *Attorney, Agent, or Firm* — Ridout and Maybee LLP (57) ABSTRACT

A mobile transceiver having selectable travel modes and a method of operation are provided. In accordance with one embodiment, there is provided a method of operating a mobile transceiver having a processor, and a wireless transceiver and a satellite receiver each coupled to the processor, the method comprising: sending a message to an asset tracking service, the message from a mobile transceiver including a device identifier (ID) associated with the mobile transceiver; receiving a message from the asset tracking service, the message including an instruction for the mobile transceiver to apply a selected travel mode; and applying the selected travel mode as a current travel mode.

18 Claims, 4 Drawing Sheets

MOBILE TRANSCEIVER HAVING SELECTABLE TRAVEL MODES AND A METHOD OF OPERATION

The present disclosure relates generally to mobile transceivers, and more specifically, to a mobile transceiver having selectable travel modes and a method of operation.

BACKGROUND

Global Navigation Satellite System (GNSS) tracking devices, such as Global positioning system (GPS) tracking devices, are devices carried by objects or persons ("carriers") which measure the location of the carrier using the GNSS at regular intervals and typically store the location in internal memory. Examples of types of GNSS tracking devices include: a data logger, a data pusher and a data puller. A data logger may store the measured location data in internal memory for subsequent download and analysis. A data pusher (also known as a beacon) may send location data stored in internal memory to a server or other device in accordance with predefined parameters. A data puller (also known as a transponder) may store location data in internal memory and provides the location data in response to queries from a server or other device. GNSS tracking devices may have limited power and/or limited processing resources. Accordingly, methods of efficiently operating and deploying GNSS tracking devices may be desirable.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements can occur by way of messaging, function calls, shared memory space, and so on, without any such physical separation. As such, functions need not be implemented in physically or logically separated platforms, although they are illustrated separately for ease of explanation herein. Different devices can have different designs, such that while some devices implement some functions in fixed function hardware, other devices can implement such functions in a programmable processor with code obtained from a machine readable medium.

The present disclosure provides a mobile transceiver that may allow global and long-range tracking applications in which an asset in global and long-range transit can be tracked even though it crosses wireless carrier and network coverage boundaries while in transit. In global and long-range tracking applications the mobile transceiver and the asset being tracked may cross wireless carrier and network coverage boundaries while in transit. For example, it is not uncommon for a shipping container to originate in mainland China and travel around South Africa with a final destination in North America.

In accordance with an example embodiment of one aspect of the present disclosure, there is provided a method of operating a mobile transceiver having a processor, and a wireless transceiver and a satellite receiver each coupled to the processor, the method comprising: sending a message to an asset tracking service, the message from a mobile transceiver including a device identifier (ID) associated with the mobile transceiver; receiving a message from the asset tracking service, the message including an instruction for the mobile transceiver to apply a selected travel mode; and applying the selected travel mode as a current travel mode, including waking up the mobile transceiver in response to an alarm defined for the current travel mode, wherein the current travel mode and alarm are defined by the user-specified device configuration stored in a memory of the mobile transceiver, and performing an action associated with the alarm.

In accordance with an example embodiment of another aspect of the present disclosure, there is provided a method of operating a mobile transceiver having a processor, and a wireless transceiver and a satellite receiver each coupled to the processor, the method comprising: sending a message to an asset tracking service, the message from a mobile transceiver including a device identifier (ID) associated with the mobile transceiver; and downloading the user-specified device configuration from the asset tracking service when the device configuration of the mobile transceiver is a default device configuration.

In accordance with an example embodiment of a further aspect of the present disclosure, there is provided a mobile transceiver, comprising: a processor; a memory coupled to the processor; a wireless transceiver coupled to the processor; a satellite receiver coupled to the processor; wherein the mobile transceiver is configured to perform the methods described above and hereinafter.

In accordance with an example embodiment of a further aspect of the present disclosure, there is provided a non-transitory machine readable medium having tangibly stored thereon executable instructions that, when executed by a processor of a mobile transceiver, the mobile transceiver comprising a memory, and a wireless transceiver and a satellite receiver each coupled to the processor, wherein the executable instructions cause the mobile transceiver to perform the methods described above and hereinafter.

In accordance with an example embodiment of a further aspect of the present disclosure, there is provided a method of configuring a mobile transceiver having a processor, and a wireless transceiver and a satellite receiver each coupled to the processor, the method comprising: receiving, by a tracking server, a message from a mobile transceiver, the message including a device identifier (ID) associated with the mobile transceiver; selecting, by the tracking server, a travel mode for the mobile transceiver from a number of travel modes in accordance with the device ID and a user-specified device configuration; and sending, by the tracking server, a message to the mobile transceiver including an instruction for the mobile transceiver to apply the selected travel mode.

In accordance with an example embodiment of a further aspect of the present disclosure, there is provided a method of configuring a mobile transceiver by an asset tracking service, the mobile transceiver having a processor, and a wireless transceiver and a satellite receiver each coupled to the processor, the method comprising: receiving message from a mobile transceiver, the message including a device identifier (ID) associated with the mobile transceiver; determining a device configuration of the mobile transceiver in accordance with the device ID; and sending a user-specified device configuration to the mobile transceiver when the determined device configuration is a default device configuration.

In accordance with an example embodiment of a further aspect of the present disclosure, there is provided a server, comprising: a processor; a memory coupled to the processor, the memory including data and executable instructions for configuring the operation of the server; a communications interface coupled to the processor; wherein the server is configured to perform the methods described above and hereinafter.

In accordance with an example embodiment of a further aspect of the present disclosure, there is provided a non-transitory machine readable medium having tangibly stored thereon executable instructions that, when executed by a processor of a server, cause the mobile transceiver to perform the methods described above and hereinafter.

Figure 1:
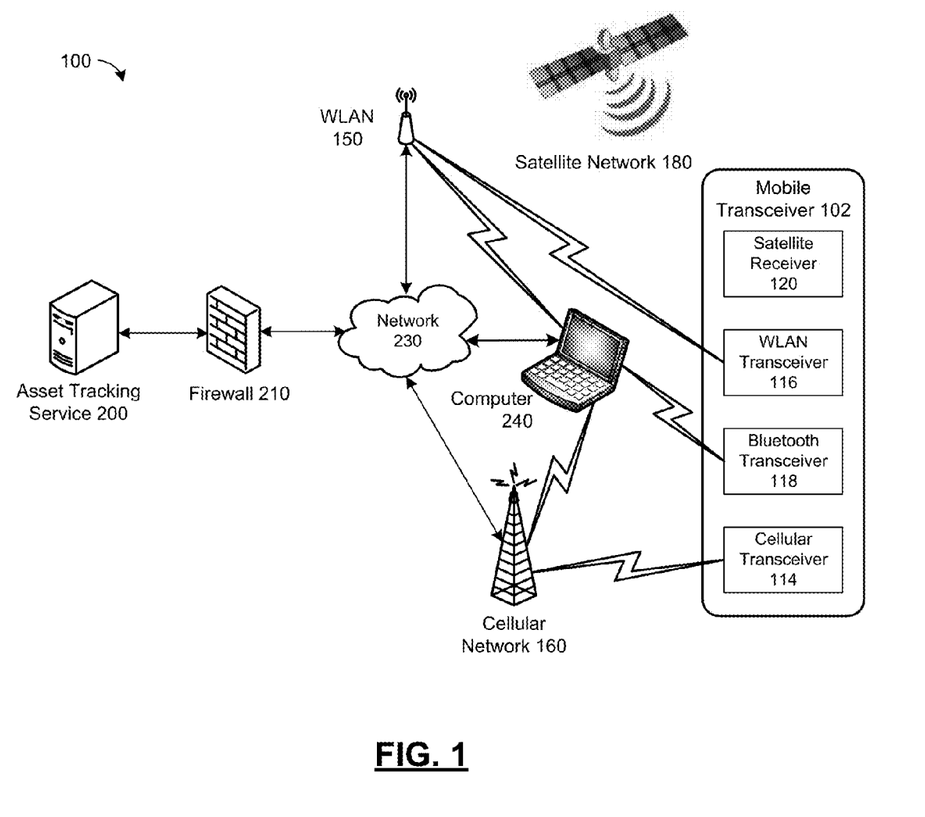
FIG. 1 is a block diagram illustrating a communication system suitable for operating a mobile transceiver in accordance with the present disclosure.
Figure 2:
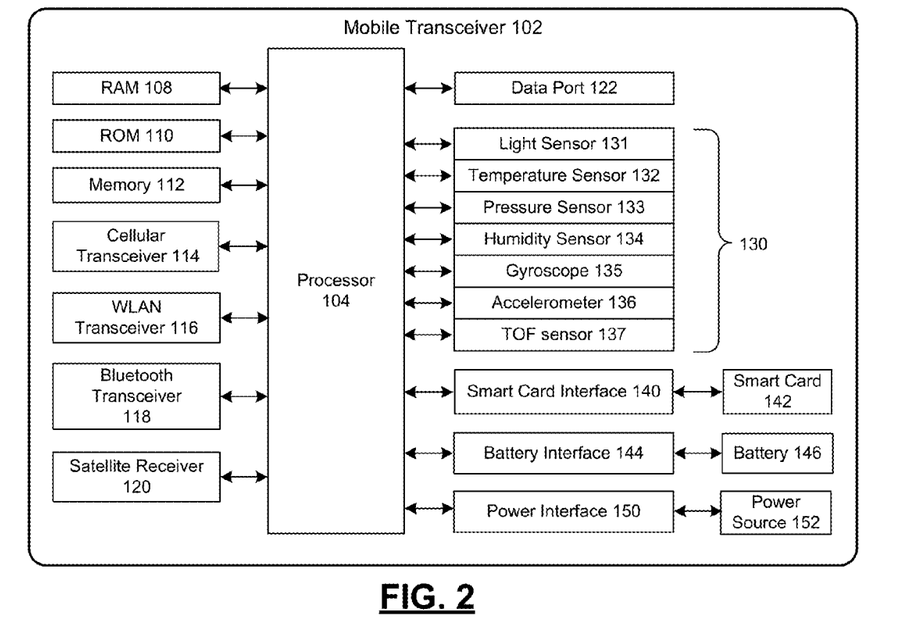
FIG. 2 is a block diagram illustrating a mobile transceiver in accordance with an example embodiment of the present disclosure.

Referring to FIGS. 1 and 2, an example embodiment of a mobile transceiver 102 of the present disclosure will be described. The mobile transceiver 102 comprises at least one processor 104 which controls the overall operation of the mobile transceiver 102. The processor 104 is coupled to a plurality of components via a communication bus (not shown) which provides a communication path between the components and the processor 104. The mobile transceiver 102 also comprises a Random Access Memory (RAM) 108, Read Only Memory (ROM) 110, a persistent (non-volatile) memory 112 which may be flash erasable programmable read only memory (EPROM) ("flash memory") or other suitable form of memory, a data port 122 such as a serial data port (e.g., Universal Serial Bus (USB) data port), and a plurality of environmental sensors 130 for sensing the environment of the mobile transceiver 102. The sensors 130 may comprise a light sensor 131, temperature sensor 132, pressure sensor 133, humidity sensor 134, gyroscope 135, accelerometer 136, one or more time-of-flight (ToF) sensors 137 and possibly other sensors such as a door contact switch (not shown).

The ToF sensor 137 may be configured and positioned within the sensor compartment for detecting objects in a first direction through a transmissive panel in a housing of the mobile transceiver 102 and outside of the mobile transceiver 102, i.e. within the interior of the shipping container when the mobile transceiver 102 is mounted to the shipping container. The ToF sensor 137 may be used for detecting objects within the interior of the shipping container by measuring the distance between the mobile transceiver 102 and the nearest object in the first direction, and determining whether the shipper container is loaded/full (e.g., one or more objects detected) or unloaded/empty (e.g., no objects detected). Alternatively, a camera could be used to determine if the container is full or empty.

The mobile transceiver 102 also comprises a satellite receiver 120 for receiving satellite signals from a satellite network 180 that comprises a plurality of satellites which are part of a global or regional satellite navigation system. In some embodiments, a satellite transceiver capable of both receiving and sending satellite signals may be provided instead of a satellite receiver which can only receive satellite signals.

The mobile transceiver 102 can use signals received by the satellite receiver 120 from a plurality of satellites in the satellite network 180 to determine its position. In at least some embodiments, the satellite network 180 comprises a plurality of satellites which are part of at least one Global Navigation Satellite System (GNSS) that provides autonomous geo-spatial positioning with global coverage. For example, the satellite network 180 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

The mobile transceiver 102 also comprises one or more wireless transceivers for exchanging at least data communication. The wireless transceivers comprises at least a cellular (RF) transceiver 114 for communicating with a plurality of different radio access networks (RAN) such as a cellular network 160 using different wireless data communication protocols and standards. The mobile transceiver 102 may communicate with any one of a plurality of fixed transceiver base stations (one of which is shown in FIG. 1) of the cellular network 160 within its geographic coverage area. The mobile transceiver 102 may send and receive signals over the cellular network 160 after the required network registration and/or activation procedures have been completed. In the described embodiment, the cellular transceiver 114 is a multi-band transceiver that supports multiple radio frequency bands which may include, for example, multiple 4G Long-Term Evolution (LTE) or LTE Advanced bands as well as global 3G and 2G bands such as, for example, a TOBY-L2 series wireless transceiver from u-blox Holding AG of Switzerland. In other embodiments, multiple dedicated transceivers may be provided to support different wireless services, such as 4G LTE, 3G and 2G wireless services.

Examples of technologies that can be used by the cellular transceiver 114 include LTE, LTE Advanced, General Packet Radio Service (GPRS), Mobitex™, and Data TACT™. Other example technologies that can be used by the cellular transceiver 114 include Advanced Mobile Phone System (AMPS), time division multiple access (TDMA), Code Division Multiple Access (CDMA), Wideband code division multiple access (W-CDMA), Personal Communication Service (PCS), GSM (Global System for Mobile Communication), Cellular Digital Packet Data (CDPD), integrated Digital Enhanced Network (iDEN), High-Speed Downlink Packet Access (HSPDA), Evolution-Data Optimized (EvDO), Enhanced Data rates for GSM Evolution (EDGE), etc. Other types of communication networks, both separate and integrated, may also be utilized with the mobile transceiver 102. The mobile transceiver 102 may also be compliant with other communication standards such as 3GSM, 3rd Generation Partnership Project (3GPP), Universal Mobile Telecommunication System (UMTS), 4G, etc. The above-noted technologies are used by example and are not exhaustive. The described embodiments do not depend on any particular characteristics or capabilities of the RAN.

The wireless transceivers may also comprise a wireless local area network (WLAN) transceiver 116 for communicating with a WLAN 150 via a WLAN access point (AP). The WLAN 150 may comprise a Wi-Fi wireless network which conforms to IEEE 802.11x standards (sometimes referred to as Wi-Fi®). Other communication protocols may be used for the WLAN 104 in other embodiments.

The wireless transceivers may also comprise a short-range wireless transceiver, such as a Bluetooth® transceiver 118, for communicating with a computer 240. The mobile transceiver 102 may alternatively communicate with the computer 240 using a physical link such as the data port 122 (e.g., USB port). The Bluetooth transceiver 118 could be compatible with any suitable version of the Bluetooth protocol including Bluetooth low energy (Bluetooth Smart). Other short-range wireless communication technologies may be provided instead of, or in addition to, Bluetooth® including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

Data received by the mobile transceiver 102 may be decompressed and decrypted by a decoder (not shown). The communication subsystem of the mobile transceiver 102 also includes one or more antennas, a processor such as a digital signal processor (DSP), and local oscillators (LOs). The specific design and implementation of the communication subsystem is dependent upon the wireless communication technologies implemented by the mobile transceiver 102.

Network access requirements vary depending upon the type of cellular network 160. In the described embodiment, the mobile transceiver 102 includes a smart card interface 140 for receiving a smart card 142 for storing and reading data by the processor 104. The smart card 142 may be a Subscriber Identity Module (SIM) card for use in a GSM network or other type of smart card for use in the relevant wireless network type which provides wireless network access. In at least some embodiments, the smart card 142 is a Universal Integrated Circuit Card (UICC) containing at least a SIM and a USIM application. UICC is the smart card used in most contemporary GSM and UMTS networks. While a SIM card for a GSM network has been described as an example, the term smart card is intended to encompass all types of smart cards and other similar technology for providing a Universal Subscriber Identity Module (USIM), Removable User Identity Module (R-UIM) or CDMA Subscriber Identity Module (CSIM) or other similar technology used in UMTS and CDMA networks.

The mobile transceiver 102 also includes a battery 146 as a power source. The battery 146 may be a rechargeable or non-rechargeable battery. The battery 146 provides electrical power to at least some of the components of the mobile transceiver 102. A battery interface 144 provides a mechanical and electrical connection for the battery 146. The battery interface 144 may be coupled to a regulator (not shown) which provides power V+ to the circuitry of the mobile transceiver 102. In some embodiments, the battery 146 is a large-capacity, non-rechargeable, sealed battery which is expected to have a relatively long service life, such as 5-7 years of active service. It will be appreciated that the mobile transceiver 102 is intended for uninterrupted operation even though one or more components, such as the cellular transceiver 114, satellite receiver 120 and/or sensors 130 may be put into a low power mode periodically to conserve battery life. An initialization date or similar date when the mobile transceiver 102 was first powered on, e.g. when the battery 146 is first installed, may be used to determine the date and time of the first power up. Due to the desire for uninterrupted operation, it is contemplated that the mobile transceiver 102 may lack a power button (on/off button) in some embodiments.

The mobile transceiver 102 may also include a power interface, such as a power port, for connecting to an external power source 152 such as an alternating current (AC) power adapter. The mobile transceiver 102 can use the external power source 152 rather than the battery 146. If the battery 146 is rechargeable, the external power source 152 may be used to recharge the battery 146.

Referring again to FIG. 1, an example communication system 100 in which a mobile transceiver 102 of the present disclosure can operate will be described. The mobile transceiver 102 typically uses the cellular network 160 to access an asset tracking service (e.g., a server or fleet management system) 200. The asset tracking service 200 may be implemented as one or more server modules and is typically located behind a firewall 210. The asset tracking service 200 provides administrative control and management capabilities over a plurality of managed mobile transceivers 102. The asset tracking service 200 may be embodied as a variety of configurations, in hardware or software, including a server-based system, an Application Programming Interface (API) and/or endpoint that provides access and abstraction of the functionality of asset tracking service 200 such that no hardware or configuration information is necessary to access the functionality other than the API location and functional definitions.

The asset tracking service 200 provides secure transmission of data exchanged between the asset tracking service 200 and the plurality of managed mobile transceivers 102. Communication between the asset tracking service 200 and the mobile transceivers 102 may be encrypted, for example, using Advanced Encryption Standard (AES) or Triple Data Encryption Standard (Triple DES) encryption.

The mobile transceiver 102 use signals received by the satellite receiver 120 from a plurality of satellites in the satellite network 180 to determine its position. For example, the mobile transceiver 102 may use the satellite receiver 120 to determine is location in response to an alarm. An alarm is a configurable wakeup event which causes the mobile transceiver 102, or a subsystem of the mobile transceiver 102 such as the satellite receiver 120 or one or more sensors 130, to wake up from a low power mode such as a sleep mode and perform configured actions (e.g., performs measurements of location and sensors) which are then logged and/or reported to the asset tracking service 200. The alarm may be a time-based alarm which the subsystem wakes up at regular intervals in accordance with a predefined schedule among other possibilities. The frequency or schedule at which the location is determined may be fixed or configurable. The mobile transceiver 102 stores the determined location, typically in terms of Latitude and Longitude, and a time at which the location was determined in a data log stored in the memory 112 of the mobile transceiver 102. Thus, the data log provides an asset tracking log.

As noted above, the mobile transceiver 102 may also use one or more of the sensors 130 to sense or measure an environment of the mobile transceiver 102 in response to an alarm. For example, the sensors 130 may be used to measure temperature, pressure and humidity, as well as door open or movement events, among other parameters. The sensor data obtained via the sensors 130 and a time at which the sensor data was obtained are also stored in the data log (i.e., the asset tracking log), which is stored in the memory 112. As with the location data, the mobile transceiver 102 may collect sensor data at regular intervals, in accordance with a predefined schedule, or in response to an alarm. The frequency or schedule at which sensor data is obtained may be fixed or configurable.

The mobile transceiver 102 attempts to connect to the asset tracking service 200 to report location and/or sensor data stored in the asset tracking log at regular intervals, in accordance with a predefined schedule, or in response to an alarm. The frequency or schedule at which the mobile transceiver 102 attempts to connect to the asset tracking service 200 may be fixed or configurable. The mobile transceiver 102 typically attempts to connect to the asset tracking service 200 using a wireless transceiver such as the cellular transceiver 114. The mobile transceiver 102 has access to multiple wireless services provided by multiple wireless transceivers, each of which provides access to one or more wireless services. In the described embodiment, the multiple wireless transceivers comprise the cellular transceiver 114, WLAN transceiver 116, and Bluetooth transceiver 118. The wireless transceivers may include multiple cellular transceivers 114 in some embodiments, which may be multi-band cellular transceivers 114. The mobile transceiver 102 could also attempt to connect to the asset tracking service 200 using a physical link, either directly or indirectly via the computer 240. Each wireless service supported by the mobile transceiver 102 may be defined by a standard or specification. Non-limiting examples of wireless service described elsewhere in the present disclosure and include 4G Long-Term Evolution (LTE), 3G and 2G, WLAN and Bluetooth.

When the mobile transceiver 102 connects to the cellular network 160, WLAN 150, or computer 240 via Bluetooth and/or USB, the mobile transceiver 102 can send the data log or a portion of the data log (i.e., an unreported portion of the data log) to the asset tracking service 200 through the firewall 210 using a communication network 230. The data log information may be sent using any suitable message format including, for example, a proprietary message format. The mobile transceiver 102 data log typically includes an indicator regarding which data in the data log has been reported and which data in the data log is unreported. For example, in some embodiments, the data log comprises a series of records including and identified by a record identifier (ID). Each record also includes a time at which the record was made, location data and/or sensor data, and a report status indicating whether the record has been reported to the asset tracking service 200. After an unreported record is reported to the asset tracking service 200, its corresponding report status field in the data log is updated.

The mobile transceiver 102 powers-down certain device components when not in use to conserve battery power. For example, the mobile transceiver 102 initiates a low power mode for the cellular transceiver 114 after a reporting time/cycle. The low power mode may be an off mode (also known as an off state) in which the cellular transceiver 114 is unpowered or a sleep mode (also known as a standby mode or suspended operation mode) with low power consumption. The cellular transceiver 114 is then activated from the low power mode at the next reporting time/cycle. Any other wireless transceivers are similarly placed into a low power mode after a reporting time/cycle. The satellite receiver 120 and sensors 130 may also be placed into a low power mode when not obtaining location or sensor data, and then activated from the low power mode at the next measurement time/cycle.

The data logging and data reporting cycles are typically different and do not coincide, although the cycles may overlap to varying degrees. For example, each reporting cycle typically involves reporting several records of the data log each including location data and/or sensor data. The cycles may overlap in that location data and/or sensor data may be captured as part of a common process at some times or may be captured as part of a separate process performed just prior to reporting logged data to the asset tracking service 200. For example, a wireless transceiver may be awaken for reporting at the same time, or just after, the satellite receiver 120 and/or sensors 130 are awaken and location data and/or sensor data is captured.

The communication system 100 is provided for the purpose of illustration only. The communication system 100 is but one possible configuration of a multitude of possible communication network configurations for use with the mobile transceiver 102. Suitable variations will be understood to a person of skill in the art and are intended to fall within the scope of the present disclosure. For example, while individual networks have been represented for convenience, it will be appreciated that multiple networks of each type and intermediate networks connected to the shown networks may be provided. Also, the communication links represented in FIG. 1 can be implemented using public and/or private networks that can communicate using packet data technologies, such as X.25 or Internet Protocol (IP) based addressing and routing techniques. Some connections can be implemented as secure connections, for example, using Virtual Private Network (VPN) technologies.

Figure 3:
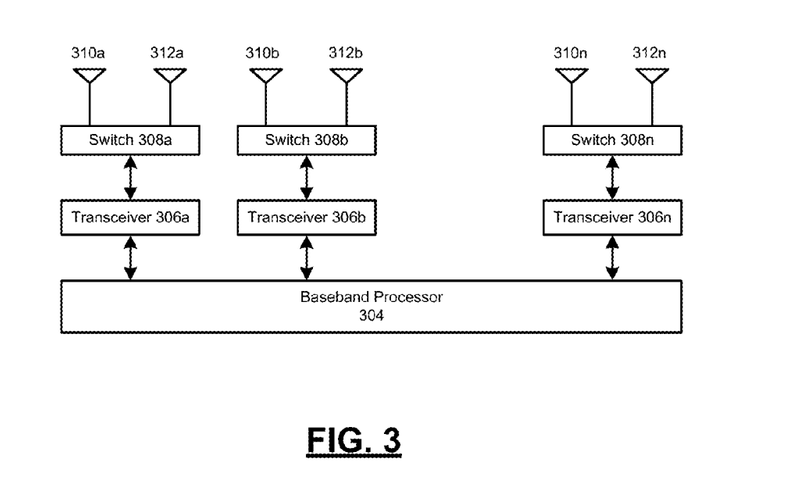
FIG. 3 is a block diagram illustrating a wireless communication subsystem in accordance with an example embodiment of the present disclosure.

Referring now to FIG. 3, a wireless communication subsystem 300 in accordance with an example embodiment of the present disclosure will be described. The wireless communication subsystem 300 includes a digital baseband processor 304 which manages functions that require an antenna, and a plurality of wireless transceivers and/or receivers 306, represented individually by references 306a, 306b, . . . 306n. Each of the wireless transceivers/receivers 306 is coupled to a switch 308, represented individually by references 308a, 308b, . . . 308n, which is coupled to an internal antenna 310, represented individually by references 310a, 310b, . . . 310n, and an external antenna 312, represented individually by references 312a, 312b, . . . 312n. The external antennas 312 typically serve as the primary antennas because of the reduced RF interference associated with being located outside of the shipping container 400, whereas the internal antennas 310 typically serve as secondary antennas because of the increased RF interference associated with being located inside of the shipping container 400.

It at least some embodiments, the external antennas 312 are provided in a common external antenna module, and a ground pin of the external antenna module is connected to a general-purpose input/output (GPIO) pin of the processor 104 which can be monitored, for example, when the mobile transceiver 102 wakes up. When the ground pin of the external antenna module is not detected, this is an indication that the external antenna module is disconnected, an electronic malfunction has occurred in the external antenna module, or the external antenna 312 and/or the external housing module 504 has been otherwise damaged or tampered with. In other embodiments, a ground pin of each external antenna 312 may be individually connected to a GPIO pin of the processor 104.

As noted above, the wireless transceivers/receivers 306 include at least one cellular transceiver 114 such as a multi-band cellular transceiver that supports multiple radio frequency bands which may include, for example, multiple 4G Long-Term Evolution (LTE) or LTE Advanced bands as well as global 3G and 2G bands and at least one satellite receiver 120.

While a common baseband processor 304 for the cellular transceiver 114 and satellite receiver 120 has been described, in other embodiments a separate baseband processor could be provided for the satellite receiver 120 and the cellular transceiver 114. In the wireless communication subsystem 300, the cellular transceiver 114 and satellite receiver 120 are individually switched and capable of operating independently. Consequently, the satellite receiver 120 can use an external antenna 312 while the cellular transceiver 114 uses an internal antenna 310, or vice versa, the satellite receiver 120 and the cellular transceiver 114 can both use an external antennas 312, or the satellite receiver 120 and the cellular transceiver 114 can both use an internal antennas 30. The baseband processor 304, or main processor 104, selects either the internal antenna 310 or external antenna 312 for the satellite receiver 120 and the cellular transceiver 114 depending on factors such as signal quality and ancillary information from the sensors 130. Each of the wireless transceivers/receivers 306 (e.g., the satellite receiver 120 and the cellular transceiver 114) may also be separately powered-on, powered-off or placed into a sleep mode.

While not shown, each of the wireless transceivers/receivers 306 has an RF front end circuit (also known as a transceiver module/receiver module) which generally includes all components between the antennas and the digital baseband processor 304. For example, the RF front end circuit of a cellular transceiver includes a receiver, a transmitter, and local oscillators (LOs). The receiver performs common receiver functions as signal amplification, frequency down conversion, filtering, channel selection, etc., as well as analog-to-digital conversion (ADC). The ADC of a received signal allows more complex communication functions such as demodulation and decoding to be performed by the digital baseband processor 304. In a similar manner, signals to be transmitted are processed, including modulation and encoding, for example, by the digital baseband processor 304. The processed signals are input to the transmitter for digital-to-analog conversion (DAC), frequency up conversion, filtering, amplification, and transmission via the antennas. A receiver, lacking transmitting functions, typically omits components required for receiving.

Custom Device Configuration and Travel Modes

The mobile transceiver 102 is intended to be attached to, or incorporated in, a moveable asset to track its location using a satellite receiver 120 as well as sensing or measuring other conditions, such as temperature, humidity, general operating conditions, average speed, maximum speed, content status, door open or closed condition, etc. using the sensors 130. The asset tracked by the mobile transceiver 102 may be a shipping container, truck, rail car, automobile, etc. Tracking requirements for tracking assets may vary depending on the mode of transportation (e.g., ship, rail, car (also known as street), and possibly air). For example, if the mobile transceiver 102 is attached to an asset that is being moved by rail, the logging and/or reporting may be at longer intervals than if the asset was being moved by truck through town streets. Also, different sensors 130 may be monitored depending on the mode of transportation. For example, there may be no need to check for door open or close status while mobile transceiver 102 is being moved by ship.

The mobile transceiver 102 of the present disclosure is configured to provide a number of selectable travel modes which allow the functionality of the mobile transceiver 102 to be set in accordance with the travel mode. In some embodiments, all travel modes of the mobile transceiver 102 are defined by a custom user-specified device configuration, which is stored in a device configuration file in the memory 112. Alternatively, individual configuration files may be provided for each travel mode. The custom device configuration defines alarms (e.g., wakeup or trigger events) which wake up the mobile transceiver 102 from an inactive mode (e.g., sleep mode) to determine the device status, including location and/or environmental conditions at a particular time, and report the device status to the asset tracking service 200. The alarms events may be scheduled events, for example based on a time of day or frequency, or unscheduled events which asynchronously wake up the mobile transceiver 102 to report the device status.

The provision of a number of selectable travel modes allows the functionality of the mobile transceiver 102 to be changed by changing the selected travel mode. This is advantageous over a fixed functionality since tracking requirements may vary. This is also advantageous in that different hardware and software based on the expected asset travel is not required, thereby decreasing the cost of production and inventory support. Also, providing a number of selectable travel modes in the device configuration allows different travel modes to be used without updating the device software each time a new travel mode is to be used. This avoids downloading different software and/or device configurations over the air every time the travel mode for the asset changes, thereby conserving power and computing resources and allows the functionality of the mobile transceiver 102 to be highly configurable. Furthermore, the travel mode is typically selected by the asset tracking service 200, thereby conserving power and computing resources of the mobile transceiver 102 by allowing the mobile transceiver 102 to server as a thin client. Server-specified travel modes also allows centralized control over a group or fleet of managed devices, thereby reducing the total cost of ownership (TCO) as well as allowing either individual, remote control of a particular mobile transceiver 102 or synchronized of settings across the fleet of managed devices.

Each travel mode specifies the functionality of the mobile transceiver 102, including the functionality of the cellular transceiver 114, satellite receiver 120 and/or sensors 130 with respect to data logging and reporting activities. Each travel mode defines a different operational mode of the mobile transceiver 102, including when and what data (e.g., location and/or sensor data) is to be measured, stored and transmitted to the asset tracking service 200. The travel modes may include, but are not limited to, "Rail", "Ship", "Street", "Dock", "Home", "Warehouse", "Distribution Centre", "Outside", "Inside", "Parked", etc. New travel modes may be created as needed based on customer requirements and the new travel modes may be assigned a descriptive name to distinguish it from existing travel modes. The travel modes may be associated with any one or more of a location, location history, sensor data (e.g., temperature, humidity, door open/closed, etc.), time, mode of transportation, triggered alarms, asset type, asset contents, asset value, driver profile or custom requirements specified by the customer. The asset types may include cargo/container or vehicle, or more specifically oil truck, milk truck, service truck, freight truck, taxi/limo, rental car, intermodal container, crate, tank container, gas tank, insulated shipping container, flexible intermediate bulk container, intermediate bulk container, etc. The asset contents may include, refrigerated, non-refrigerated, perishable, dry good cargo, farm produce, construction materials, logging goods, oil, weapons, aviation contents, flammable liquids, liquid hydrogen or other super cooled liquids, poisonous materials/liquids, radioactive materials, etc. The asset value may high value, low value (or non-high value), explosive, radioactive, confidential documents, poisonous, flammable, perishable, dry goods, logs/woods, etc. The driver profile may be good or bad, or other rating. A travel mode may be defined for any of the above factors, e.g. asset type, asset contents, and asset value. The travel modes of the device configuration can be selected based on a number of factors, described below.

The mobile transceiver 102 is in a sleep mode much of the time to conserve power and wakes up in response to alarms. For example, the mobile transceiver 102 may wake up only at predetermined time intervals or due to detections or measurements by the sensors 130. When the mobile transceiver 102 wakes up from sleep mode, the mobile transceiver 102 typically determines its location using the satellite receiver 120 and/or measures one or more environmental conditions using one or more of the sensors 130, stores the measured data in a data log in memory 112, and then reports the device status to the asset tracking service 200, for example, by sending at least a portion of a data log to the asset tracking service 200 over the Internet via the cellular transceiver 114. For example, the mobile transceiver 102 may wake up every hour to determine and report the device status, or the mobile transceiver 102 may wake up when a door of the shipping container to which it is attached is opened. When the mobile transceiver 102 wakes up, the mobile transceiver 102 may determine the reason for the alarm. The mobile transceiver 102 may then determine its location using the satellite receiver 120 and/or measure one or more environmental conditions based on the alarm type. The mobile transceiver 102 may then transmit the measured data to the asset tracking service 200. The mobile transceiver 102 then goes back to into the sleep mode until it wakes up in response to another alarm.

The device configuration is configurable based on tracking requirements. For example, the device configuration may depend on a type of asset being tracked. For example, a refrigerated container may need to check temperature more often and under different conditions than a non-refrigerated container. The device configuration may also depend on an expected cargo of the asset (e.g., contents of shipping container) or a value of the asset (e.g., truck or car). For example, for high value cargo more frequent data logging and/or reporting may be desired (e.g., every 5 minutes rather than a normal frequency of every 15 minutes). The device configuration may also depend on expected routes, transportation types or other factors. The device configuration may be managed as a value added service provided by a third party service provider who maintains or controls the asset tracking service 200, or the device configuration may be managed directly by users.

In the described embodiment, the device configuration defines a number of alarms. Each alarm is defined by a number of parameters that includes an identifier (ID) such as a unique number to identify the alarm, a travel mode with which the alarm is to be used, an alarm type that identifies a type of the alarm, one or more condition parameters to be satisfied for the alarm to be triggered, and one or more actions to take when the alarm is triggered. In other embodiments, the device configuration defines travel modes which each include a travel mode ID and one or more alarms to be used in the travel mode. The alarms may be specified by an alarm ID, an alarm type that identifies a type of the alarm, one or more condition parameters to be satisfied for the alarm to be triggered, and one or more actions to take when the alarm is triggered.

In the described embodiment, the travel modes include "Rail", "Ship", "Street", "Dock", "Home", and "All". However, each of the travel modes is not required, and other travel modes may be used in other embodiments. The "All" travel mode is used in the described embodiment to facilitate configuration and cannot be selected as the active or current travel mode. The "All" travel mode identifies alarms that are to be used in all travel modes, i.e., alarms that are always active. The "All" travel mode may be used to define common or default functionality, such as reporting to asset tracking service 200 once every day. In other embodiments, the "All" travel mode may be omitted and common or default alarms that are to be used in all travel modes are specified individually in the definition of each travel mode.

The mobile transceiver 102 has a travel mode defined at all times. The current travel mode may be defined by a parameter or setting stored in the memory 112. For example, the current travel mode may be "Rail" when the available travel modes are "Rail", "Ship", "Street", "Dock", "Home". The alarms for the current travel mode are defined in the device configuration file and are only active when the selected travel mode matches the current travel mode. Otherwise, the alarms are disabled and ignored. For example, when the current device travel mode is "Rail", the only active alarms are those that correspond to the "Rail" travel mode and the "All" travel mode.

The alarm types are typically based on either time or sensor data. There are two sub-types of time-based alarms. The first type of timed based alarm is frequency which specifies a frequency at which data is to be measured, the condition parameters for the alarm checked and reported to the asset tracking service 200. An example value for the frequency alarm is every 15 minutes. The second type of time based alarm is time (or date) which specifies a time and/or date at which the condition parameters for the alarm are checked. An example value for the frequency alarm is 12:00 PM every day. The sensor-based alarms are defined based on the capabilities of the mobile transceiver 102, i.e. the onboard sensors 130. The sensor-based alarms may include temperature, humidity, pressure, movement detection, location, location within or with respect to a specific geo-fence, door open or closed condition, etc. The alarm types may also be based on other factors such as location or location history. A geo-fence is a virtual perimeter defined by a particular geographic area using geo-spatial coordinates, such as Latitude and Longitude, used by the satellite receiver 120. A geo-fence may be fixed or dynamically generated, for example, a radius around a particular point location. The geo-fence may be a predefined set of boundaries, or may be a set of zones or areas which need not be adjacent.

The alarm actions may include the type of sensor data to measure and transmit to the asset tracking service 200 and possibly other things like running diagnostics, changing device state, location data, changing the travel mode, etc.

In the described embodiment, the device configuration file is divided into subsections, with each subsection defining an alarm, the travel mode(s) with which the alarm is used, a type of the alarm, conditions for triggering the alarm which are typically time-based or sensor-based, and the actions to take for each alarm. Other configurations are possible. For example, the device configuration file may be divided into subsections with each subsection defining the operational device characteristics for each travel mode. Alternatively, individual configuration files may be provided for each travel mode. The following table shows the contents of an example device configuration file.

| Number | Travel Mode | Type | Condition parameters | Action |
|---|---|---|---|---|
| 1 | All | Date | Wake up at 12:00PM | Read all sensors and send to server<br>Get location and send to server<br>Run diagnostics and report results to server |
| 2 | Rail | Time | Wake up every 6 hours | Read all sensors and send to server<br>Get location and send to server |
| 3 | Rail | Temperature | Temperature increases above 100° F. | Read all sensors and send to server<br>Get location and send to server |
| 4 | Rail | Door Opened | Door was opened | Read all sensors and send to server<br>Get location and send to server |
| 5 | Ship | Time | Wake up every 6 hours | Read all sensors and send to server<br>Get location and send to server |
| 6 | Street | Time | Wake up every hour | Read all sensors and send to server<br>Get location and send to server |
| 7 | Street | Temperature | Temperature increases above 100° F. | Read all sensors and send to server<br>Get location and send to server |
| 8 | Street | Temperature | Temperature decreases below 32° F. | Read temperature sensor and send to server |
| 9 | Street | Humidity | Humidity increases above 90% | Read humidity and temperature sensors and send to server |
| 10 | Street | Movement | Check if there is no movement for 10 minutes | Get location and send to server |
| 11 | Street | Door Opened | Door was opened | Read all sensors and send to server<br>Get location and send to server |
| 12 | Street | Door Closed | Door was closed | Read all sensors and send to server<br>Get location and send to server |
| 13 | Street | In Geo-fence "Dock" | Within defined geo-fence | Read all sensors and send to server |
| 14 | Street | In Geo-fence "Home" | Within defined geo-fence | Change travel mode to "Home" |
| 8 | Home | Time | Wake up every 6 hours | Read all sensors and send to server<br>Get location and send to server |
| 8 | Dock | In Geo-fence | Within defined geo-fence | Read all sensors and send to server |
| 8 | Dock | Door Opened | Door was opened | Read all sensors and send to server<br>Get location and send to server |
| 8 | Dock | Door Closed | Door was closed | Read all sensors and send to server<br>Get location and send to server |

In the table presented above, the "All" travel mode is the default used all the time regardless of the selected travel mode. The "Rail" travel mode has three entries to configure the alarms used for rail travel. The "Ship" travel mode has only one entry. The "Street" travel mode has one entry that changes the current travel mode to "Home" when the given alarm is triggered. Other configurations are possible in other embodiments.

Figure 4:
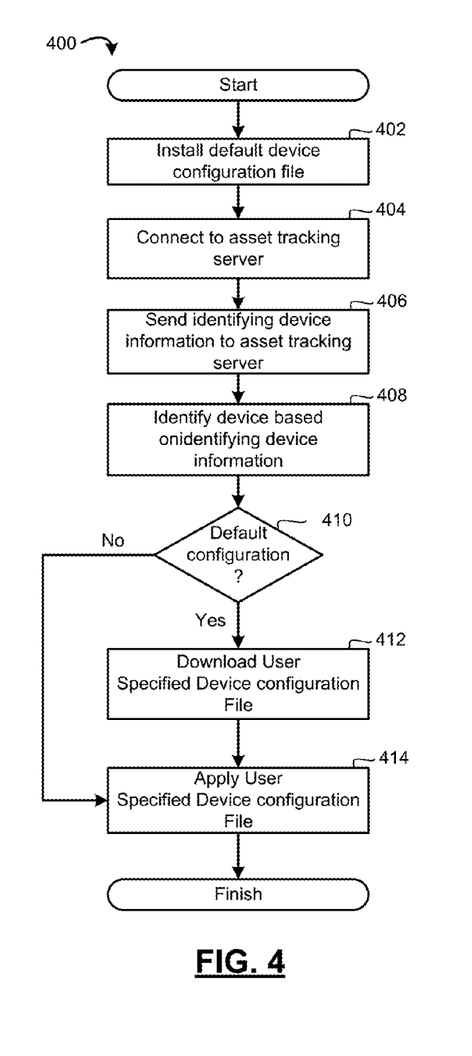
FIG. 4 is a flowchart illustrating a method of providing a device configuration in accordance with one embodiment of the present disclosure.

FIG. 4 shows an example flowchart of a method 400 of providing a device configuration for a mobile transceiver 102 such as a GNSS tracking device in accordance with one example embodiment of the present disclosure. The method may be carried out by software executed by a processor of the mobile transceiver 102. Coding of software for carrying out such a method 400 is within the scope of a person of ordinary skill in the art provided the present disclosure. The method 400 may contain additional or fewer processes than shown and/or described, and may be performed in a different order in other embodiments. Machine readable code executable by the processor to perform the method 400 may be stored in a machine readable medium such as a memory of the mobile transceiver 102.

At 402, a default device configuration file is installed on mobile transceiver 102, for example, by storing in the memory 112. The default device configuration file may be installed at the factory or another time prior to deployment in the field. The default device configuration file includes at least enough information to communicate with the asset tracking service 200 at a first power up so that once communication is established, the custom user-specified device configuration file can be downloaded from the asset tracking service 200 for use instead of the default device configuration file. The default device configuration file may include other parameters that are only needed at the first power up. For example, the default device configuration file may indicate that one or more LEDs be flashed on power up to provide a notification that the mobile transceiver 102 is powered on and/or connecting (or connected) to the asset tracking service 200. The default device configuration file typically includes only a default travel mode. When the default travel mode is the current travel mode (known as the "Default" travel mode), only the alarms associated with the default travel mode are active. The following table includes an example of default travel mode defined by the default device configuration file in which the mobile transceiver 102 wakes up every 15 minutes and attempts to communicate with the asset tracking service 200.

| Number | Travel Mode | Type | Condition parameters | Action |
|---|---|---|---|---|
| 1 | Default | Time | Wake up every 15 minutes | Send message notifying server that device is using default configuration |

The default device configuration file may be stored in the ROM 110 or other persistent memory, such as the memory 112, so that a backup of the default device configuration file is always available in the event that the user-specified device configuration file becomes corrupted, deleted or lost. Also, if the device software is re-flashed, this would update the default device configuration file as it would be embedded with the device software. Alternatively, in other embodiments the user-specified device configuration may replace (e.g., overwrite) the default device configuration file stored in memory.

In normal operation, when the mobile transceiver 102 is first powered up and used, for example when the battery 146 is first connected after the mobile transceiver 102 is installed and/or mounted to the asset being tracked, the mobile transceiver 102 operates in accordance with the default device configuration file. As noted above, the default configuration file typically includes a default travel mode which specifies that the mobile transceiver 102 wake up periodically, for example every fifteen minutes or other reasonable interval, and attempt to establish communication with the asset tracking service 200. To save battery life, the default travel mode in the default configuration file may specify that after a threshold duration, for example one hour, that the mobile transceiver 102 wake up at longer intervals, for example every hour or even once a day, until the first communication with the asset tracking service 200 occurs.

In other embodiments, the default device configuration file may not include any travel modes. For example, the default device configuration file may specify that the mobile transceiver 102 attempt to establish communication with the asset tracking service 200 until the first communication is established, or until a threshold duration of time has lapsed without establishing communication at which time the mobile transceiver 102 may power off until the battery 146 is removed and reinstalled (which the mobile transceiver 102 retreats as a first power up) or until a power button (on/off toggle) is depressed (if one exists).

At 404, the mobile transceiver 102 establishes communication with (e.g., connect) the asset tracking service 200 over the Internet, typically via the cellular transceiver 114.

At 406, the mobile transceiver 102 sends a message to the asset tracking service 200 which includes identifying device information about the mobile transceiver 102. The identifying device information may include the device ID and optionally a device configuration file ID. The message may also include location and/or sensor data captured by the mobile transceiver 102 after the first power up. The first message may include only the device ID since that the configuration assigned to the mobile transceiver 102 can be determined based solely on device ID. The mobile transceiver 102 may also request updates (here as well as in step 506 of the flow described below, or any other communications session with asset tracking service 200) to the existing travel modes stored at mobile transceiver 102, to all known travel modes, request new travel modes, and delete existing travel modes.

At 408, the asset tracking service 200 identifies the mobile transceiver 102 based on the device ID. At 410, the asset tracking service 200 determines whether the mobile transceiver 102 is using a default device configuration file. This determination may be based, for example, on a device configuration file ID in the message or information about the mobile transceiver maintained by the asset tracking service 200. For example, the asset tracking service 200 may determine that the mobile transceiver 102 is using a default device configuration file based on the device ID when the mobile transceiver 102 is on its first power-up. The asset tracking service 200 may determine that the mobile transceiver 102 is on its first power-up in many ways, including the lack of any previous message or communication from the mobile transceiver 102 (based on its device ID) or possibly other information in the message. When the mobile transceiver 102 is using a default device configuration file, operations proceed to 412 at which the mobile transceiver 102 downloads the user-specified device configuration file. When the mobile transceiver 102 is not using the default device configuration file, i.e. it is using a user-specified device configuration, the asset tracking service 200 may optionally determine whether an updated user-specified device configuration is available. This determination may be based, for example, on a device configuration file ID in the message or information about the mobile transceiver maintained by the asset tracking service 200. If an updated user-specified device configuration is available, the mobile transceiver 102 may download the updated user-specified device configuration.

At 414, after a user-specified device configuration file is downloaded, the mobile transceiver 102 applies and starts using the downloaded user-specified device configuration file so that the functionality of the mobile transceiver 102 corresponds with the tracking requirements of the user-specified device configuration, i.e. the alarms specified by the user-specified device configuration will be implemented based on a determined travel mode. As noted above, the user-specified device configuration file includes a plurality of travel modes, whereas the default device configuration file typically includes only a default travel mode.

Figure 5:
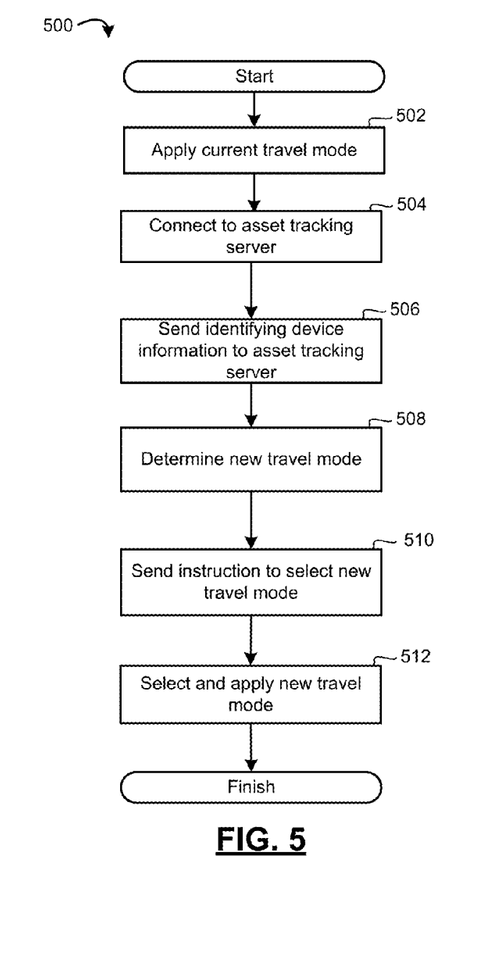
FIG. 5 is a flowchart illustrating a method of setting a travel mode in accordance with one embodiment of the present disclosure.

FIG. 5 shows an example flowchart of a method 500 of setting a travel mode for a mobile transceiver 102 such as a GNSS tracking device in accordance with one example embodiment of the present disclosure. The method may be carried out by software executed by a processor of the mobile transceiver 102. Coding of software for carrying out such a method 500 is within the scope of a person of ordinary skill in the art provided the present disclosure. The method 500 may contain additional or fewer processes than shown and/or described, and may be performed in a different order in other embodiments. Machine readable code executable by the processor to perform the method 500 may be stored in a machine readable medium such as a memory of the mobile transceiver 102.

At 502, the mobile transceiver 102 applies the current travel mode. On the first power up, the current travel mode is the default travel mode. As noted above, the mobile transceiver 102 has a travel mode defined at all times. The current travel mode is typically defined by a parameter or setting stored in the memory 112. The default travel mode is typically only set as the current travel mode on the first power up before the communication with the asset tracking service 200 has been established.

At 504, the mobile transceiver 102 connects to the asset tracking service 200.

At 506, the mobile transceiver 102 sends a message to the asset tracking service 200 which includes identifying device information about the mobile transceiver 102. The identifying device information may include a device ID and optionally a device configuration file ID. The message typically also includes operations information associated with the mobile transducer 102 or an asset being tracked. The operations information may include contextual and/or environmental information in addition to features and information relevant to the current usage. At least some of the contextual and/or environmental information may be obtained by the satellite receiver 120 and/or sensors 130. The contextual and/or environmental information may include any one or more of location, location history, sensor data, time, mode of transportation, triggered alarms, asset type, asset contents, asset value, driver profile, or custom requirements specified by the customer.

At 508, the asset tracking service 200 determines the travel mode for the mobile transceiver 102 based on the device ID and possibly the contextual and/or environmental information. The device ID may be correlated to the mode of transportation being taken and/or a travel itinerary for the asset being tracked.

At 510, the asset tracking service 200 sends a message to the mobile transceiver 102 instructing the mobile transceiver 102 to change to a new travel mode.

At 512, the mobile transceiver 102 selects and applies the new travel mode in accordance with the message received from the asset tracking service 200. The alarms associated with the new travel mode are then active, and all other alarms that were active become inactive. Active alarms are alarms used by the mobile transceiver 102 to trigger measuring and/or reporting events. Inactive alarms are ignored.

It will be appreciated that the methods 400 and 500 may be performed together or combined in a common method. For example, operations 508 to 512 of the method 500 may be performed after operation 414 of the method 400. The asset tracking service 200 may determine the travel mode for the mobile transceiver 102 based on the device ID and possibly contextual and/or environmental information may include any one or more of location, location history, sensor data, time, mode of transportation, triggered alarms, asset type, asset contents, asset value, driver profile, or custom requirements specified by the customer (operation 510) at any time after the asset tracking service 200 receives the message from the mobile transceiver 102 including the identifying device information (e.g., device ID) and optionally location/location history and/or sensor data. The message instructing the mobile transceiver 102 to change to a new travel mode (operation 510) may be sent at the same time, or shortly after, the user-specified device configuration file is downloaded to the mobile transceiver 102.

The travel mode may also be changed by the mobile transceiver 102 in accordance with the instructions in the user-specified device configuration file. For example, the new travel mode may be determined based on operations information associated with the mobile transducer or an asset being tracked. The operations information may comprise contextual and/or environmental information. The contextual and/or environmental information may include one or more of location, location history, sensor data, time, mode of transportation, triggered alarms, asset type, asset contents, asset value, driver profile, or custom requirements.

For example, when the tracked asset and mobile transceiver 102 enter a "Home" geo-fence, the mobile transceiver 102 may change the travel mode to use the "Home" travel mode. For another example, for a refrigerated truck the travel mode may change to "Panic" travel mode when the temperature increases above a certain threshold. In the "Panic" mode, the frequency of alarms (e.g., measuring location and/or other sensor data and/or reporting acquired location and/or other sensor data) may be increased. An audible alarm may be sounded in addition to, or instead of, increasing the alarms. For another example, the travel mode may change to "Intrusion Alert" travel mode when the door is open while in the "Rail" mode. In the "Intrusion Alert" mode, the frequency of measuring and/or reporting acquired data may be increased, particularly location information, since the asset may be stolen. The alarms may also trigger updates on asset contents (e.g., full/empty state) whereas this was not required in the previous travel mode. Whereas in a normal travel mode, such as Street, Rail, or Warehouse travel modes, the travel mode configuration attempts to minimize wakeups to conserve battery life, in panic or alert mode, battery life is no longer a priority more types of data and/or more frequently data may be gathered and sent to the asset tracking service 200. This may allow the operators of the asset tracking service 200 to determine if there was a false alarm or special procedures need to be followed (example, call driver, call police, etc.). Thus, the travel mode may be changed to a new travel mode having an increased alarm (e.g., wakeup) frequency and/or which measures additionally data and/or reports the acquired data more frequently. Conversely, the travel mode may be changed to a new travel mode having a decreased alarm (e.g., wakeup) frequency and/or which measures additionally data and/or reports the acquired data less frequently (for example, when returning from a panic, alarm or monitor mode to a normal mode such as Street, Rail, or Warehouse).

For another example, if an asset is late for delivery, the asset tracking service 200 may send a message to change the travel mode from "Street" to "Monitor", for example, where the "Monitor" travel mode may gather and send more information (e.g., asset location and/or speed) to the asset tracking service 200 more often. For another example, when the tracked asset and mobile transceiver 102 do not move for a threshold duration, the mobile transceiver 102 may change the travel mode to use a "Parked" or "Stopped" travel mode. The change in travel mode in these examples would be specified in the user-specified device configuration file as the action to take when the appropriate alarm is triggered. It will be appreciated that the asset tracking service 200 could make a similar determination as the mobile transceiver 102 in these examples.

Figure 6:
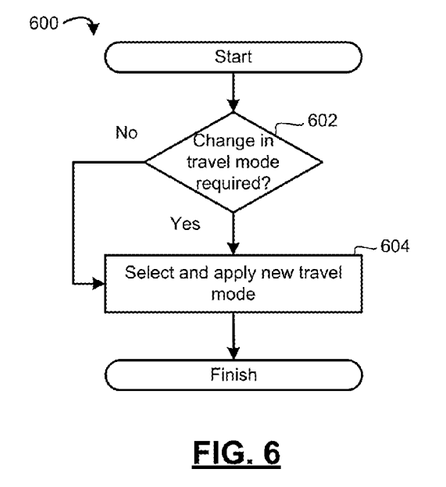
FIG. 6 is a flowchart illustrating a method of setting a travel mode in accordance with another embodiment of the present disclosure.

FIG. 6 shows an example flowchart of a method 600 of setting a travel mode for a mobile transceiver 102 such as a GNSS tracking device in accordance with one example embodiment of the present disclosure. The method may be carried out by software executed by a processor of the mobile transceiver 102. Coding of software for carrying out such a method 600 is within the scope of a person of ordinary skill in the art provided the present disclosure. The method 600 may contain additional or fewer processes than shown and/or described, and may be performed in a different order in other embodiments. Machine readable code executable by the processor to perform the method 600 may be stored in a machine readable medium such as a memory of the mobile transceiver 102.

At 602, the mobile transceiver 102 monitors for one or more condition parameters specified by an active alarm having an action which changes the travel mode.

At 604, when a condition parameter specified by an active alarm which changes the travel mode is detected, the mobile transceiver 102 sets the current travel mode to the new travel mode in accordance with the action specified in the alarm.

It will be appreciated that the method 600 may be performed together or combined in a common method with the methods 400 and 500.

Figure 7A:
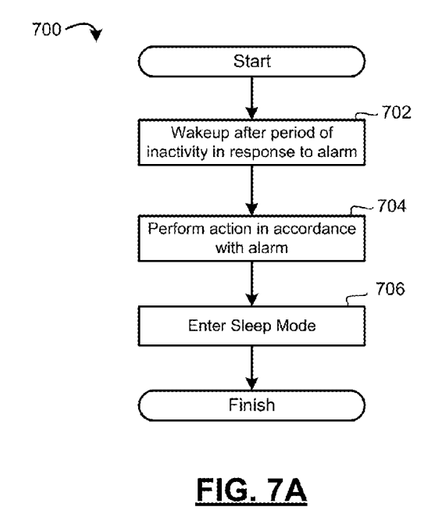
FIG. 7A-7B are flowcharts illustrating methods of operating a mobile transceiver in accordance with example embodiments of the present disclosure.
Figure 7B:
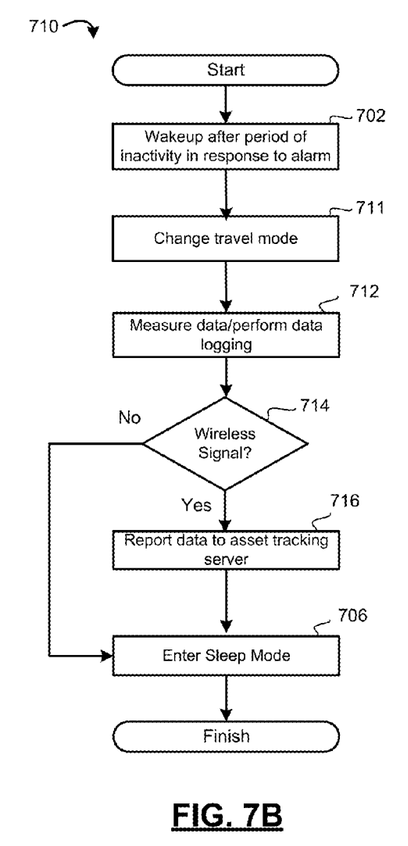

FIGS. 7A and 7B show example flowcharts of methods 700, 710 of operating a mobile transceiver 102 such as a GNSS tracking device in accordance with one example embodiment of the present disclosure. The method may be carried out by software executed by a processor of the mobile transceiver 102. Coding of software for carrying out such a method 700 or 710 is within the scope of a person of ordinary skill in the art provided the present disclosure. The methods 700 and 710 may contain additional or fewer processes than shown and/or described, and may be performed in a different order in other embodiments. Machine readable code executable by the processor to perform the method 700 or 710 may be stored in a machine readable medium such as a memory of the mobile transceiver 102.

FIG. 7A illustrates a general method. At 702, the mobile transceiver 102 wakes up after a period of inactivity in response to an alarm, such as time-based or sensor-based alarm. The mobile transceiver 102 may wake up from a sleep mode in which one or more of the processor 104, cellular transceiver 114, satellite receiver 120, and sensors 130 was in a low power mode. The wakeup may be triggered by one or any number of alarms. For example, the mobile transceiver 102 may wakeup in accordance with a time-based alarm or a sensor-based alarm caused by measurements of one or more of the sensors 130. Waking up the cellular transceiver 114 and/or satellite receiver 120 may include activating the cellular transceiver 114 and/or satellite receiver 120 from a low power mode, which may be performed by the main processor 104 or the baseband processor 304, depending on the embodiment.

At 704, the mobile transceiver 102 performs an action in response to the alarm which triggered the wake up in 702. At 706, a sleep mode is initiated for the mobile transceiver 102, for example, for one or more of the processor 104, cellular transceiver 114, satellite receiver 120 or sensors 130.

FIG. 7B illustrates a more detailed method. At 702, the mobile transceiver 102 wakes up after a period of inactivity in response to an alarm, such as time-based or sensor-based alarm.

At 711, when the action in response to the alarm which triggered the wake up in 702 includes a change in the travel, the mobile transceiver 102 changes the current travel mode to the travel associated with the alarm. Alternatively, the travel mode may be set by the mobile transducer 102 after all processing for an alarm has been completed. It will also be appreciated that the travel mode may be set by the asset tracking service 200, as described above.

At 712, when the action in response to the alarm which triggered the wake up in 702 includes measure data using the satellite receiver 120 and/or sensors 130, the mobile transceiver 102 performs a data logging in accordance with the alarm. Data logging may comprise determining its location and/or sensing its environment using the sensors 130. When determining its location, the mobile transceiver 102 determines its location using the satellite receiver 120 and stores the determined location and a time associated with the determined location in the data log in the memory 112. When sensing its location, the mobile transceiver 102 optionally senses, via one or more of the sensors 130, an environment of the mobile transceiver 102. The sensor data obtained via the sensors 130 and a time at which the sensor data was obtained is stored in the data log stored in the memory 112.

At 714, when the action in response to the alarm which triggered the wake up in 702 includes reported data to the asset tracking service 200, the mobile transceiver 102 determines whether a wireless signal for the cellular transceiver 114 is available.

When a wireless signal is available, processing proceeds to 716 at which the mobile transceiver 102 selects and accesses, or connects to, the wireless service, and sends at least a portion of the data log to the asset tracking service 200 using the wireless service.

At 706, after the mobile transceiver 102 has sent at least a portion of the data log to the asset tracking service 200 using the wireless service, a sleep mode is initiated for the mobile transceiver 102, for example, for one or more of the processor 104, cellular transceiver 114, satellite receiver 120 or sensors 130. Similarly, when a wireless signal is not available (decision block 714), operations proceed to 706 at which the sleep power mode may be initiated.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar machine readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of operating a mobile transceiver having a processor, and a wireless transceiver and a satellite receiver each coupled to the processor, the method comprising:
    sending a message to an asset tracking service, the message from a mobile transceiver including a device identifier (ID) associated with the mobile transceiver;
    receiving a message from the asset tracking service, the message including an instruction for the mobile transceiver to apply a selected travel mode; and
    applying the selected travel mode as a current travel mode, including:
        waking up the mobile transceiver in response to an alarm defined for the current travel mode, wherein the current travel mode and alarm are defined by the user-specified device configuration stored in a memory of the mobile transceiver, and
        performing an action associated with the alarm.

2. The method of claim 1, wherein the selected travel mode is based on operations information associated with the mobile transceiver or an asset being tracked.

3. The method of claim 2, wherein the operations information comprises contextual and/or environmental information includes one or more of location, location history, sensor data, time, mode of transportation, triggered alarms, asset type, asset contents, asset value, driver profile, or custom requirements.

4. The method of claim 1, wherein performing the action comprises:
    changing the current travel mode to a new travel mode.

5. The method of claim 4, wherein the new travel mode is specified by the alarm.

6. The method of claim 1, further comprising:
    sending a message to an asset tracking service, the message from a mobile transceiver requesting updates to at least one stored travel mode.

7. The method of claim 1, wherein performing the action comprises:
    measuring location and/or environmental conditions using one or more sensors; and
    sending a message to the asset tracking service reporting the measured location and/or environmental conditions.

8. The method of claim 1, wherein the alarm is time-based or sensor-based.

9. The method of claim 1, wherein, when the alarm is sensor-based, periodically measuring environmental conditions using one or more sensors associated with the sensor-based alarm, wherein the frequency of measuring and the one or more sensors to be used in the measuring are defined by the alarm.

10. The method of claim 1, further comprising:
    before applying the selected travel mode as a current travel mode, downloading the user-specified device configuration from the asset tracking service when the device configuration of the mobile transceiver is a default device configuration.

11. The method of claim 1, wherein the message from the mobile transceiver includes location information and/or sensor data measured by the mobile transceiver, and wherein the travel mode is selected in accordance with the device ID, the user-specified device configuration, and the location information and/or the sensor data.

12. The method of claim 1, wherein the travel modes comprise at least one of "Rail", "Ship", "Street", "Dock" and "Home".

13. The method of claim 1, wherein each travel mode defines one or more alarms to be used in the travel mode.

14. The method of claim 13, wherein each of the alarms are defined by an alarm ID, an alarm type that identifies a type of the alarm, one or more condition parameters to be satisfied for the alarm to be triggered, and one or more actions to take when the alarm is triggered.

15. A method of operating a mobile transceiver having a processor, and a wireless transceiver and a satellite receiver each coupled to the processor, the method comprising:
    sending a message to an asset tracking service, the message from a mobile including a device identifier (ID) associated with the mobile transceiver; and
    downloading the user-specified device configuration from the asset tracking service when the device configuration of the mobile transceiver is a default device configuration;
    selecting a travel mode; and
    applying the selected travel mode as a current travel mode, including
        waking up the mobile transceiver in response to an alarm defined for the current travel mode, wherein the current travel mode and alarm are defined by the user-specified device configuration stored in a memory of the mobile transceiver, and
        performing an action associated with the alarm.

16. A method of configuring a mobile transceiver by an asset tracking service, the mobile transceiver having a processor, and a wireless transceiver each coupled to the processor, the method comprising:
    receiving a message from a mobile transceiver, the message including a device identifier (ID);
    determining a device configuration of the mobile transceiver in accordance with the device ID; and
    sending a user-specified device configuration to the mobile transceiver when the determined device configuration is a default device configuration;
    selecting a travel mode for the mobile transceiver from a number of travel modes in accordance with the device ID and the user-specified device configuration; and
    sending a message to the mobile transceiver including instructions for the mobile transceiver to apply the selected travel mode.

17. A method of configuring a mobile transceiver by an asset tracking service, the mobile transceiver having a processor, and a wireless transceiver each coupled to the processor, the method comprising:

receiving a message from a mobile transceiver, the message including a device identifier (ID);

determining a device configuration of the mobile transceiver in accordance with the device ID; and sending a user-specified device configuration to the mobile transceiver when the determined device configuration is a default device configuration;

wherein the message from the mobile transceiver includes location information and/or sensor data measured by the mobile transceiver, and wherein a travel mode is selected in accordance with the device ID, the user-specified device configuration, and the location information and/or the sensor data.

18. A method of configuring a mobile transceiver by an asset tracking service, the mobile transceiver having a processor, and a wireless transceiver each coupled to the processor, the method comprising:

receiving a message from a mobile transceiver, the message including a device identifier (ID);

determining a device configuration of the mobile transceiver in accordance with the device ID; and sending a user-specified device configuration to the mobile transceiver when the determined device configuration is a default device configuration;

wherein the message specifies a travel mode that defines one or more alarms to be used in the travel mode, wherein each of the alarms are defined by an alarm ID, an alarm type that identifies a type of the alarm, one or more condition parameters to be satisfied for the alarm to be triggered, and one or more actions to take when the alarm is triggered.

\* \* \* \* \*